United States Patent [19]

Mancassola

[11] Patent Number: 4,768,549
[45] Date of Patent: Sep. 6, 1988

[54] RETENTION VALVE PARTICULARLY FOR LIQUID-BEARING CONDUITS

[75] Inventor: Giovanni Mancassola, Lonigo, Italy

[73] Assignee: Mondeo S.r.l., Montecchio Maggiore, Italy

[21] Appl. No.: 9,302

[22] Filed: Jan. 30, 1987

[30] Foreign Application Priority Data

Feb. 13, 1986 [IT] Italy .............................. 41523 A/86
Aug. 28, 1986 [IT] Italy ............................. 30742/86[U]

[51] Int. Cl.[4] ...................... F16K 15/06; F16K 27/10
[52] U.S. Cl. ............................... 137/516.29; 137/543; 251/367
[58] Field of Search ................. 137/516.29, 542, 543; 251/366, 367

[56] References Cited

U.S. PATENT DOCUMENTS

| | | | |
|---|---|---|---|
| 2,196,107 | 4/1940 | Dom | 251/366 X |
| 2,594,641 | 4/1952 | Griffith et al. | 137/543 |
| 2,704,547 | 3/1955 | Fox | 251/367 X |
| 2,797,704 | 7/1957 | McDermott et al. | 251/366 X |
| 2,869,221 | 1/1959 | Siepmann | 251/367 X |
| 2,942,617 | 6/1960 | Gilliam | 137/543 X |
| 3,378,030 | 4/1968 | Cary | 137/516.29 |
| 3,430,647 | 3/1969 | Suchowolec | 251/367 X |
| 3,506,239 | 4/1970 | Johnson | 251/367 X |
| 3,674,238 | 7/1972 | Pickles et al. | 251/366 X |
| 3,742,983 | 7/1973 | Harter | 251/366 X |

FOREIGN PATENT DOCUMENTS 1675420 3/1972 Fed. Rep. of Germany ...... 137/543

Primary Examiner—John Rivell
Attorney, Agent, or Firm—Guido Modiano; Albert Josif

[57] ABSTRACT

The present invention relates to a retention valve for liquid-bearing conduits, comprising a containment body provided with threaded sleeves for connecting to conduits, and, in its interior, with valve means suitable for cutting off the flow of a liquid. The containment body is provided in two parts of pressed sheet metal; the valve is characterized by small dimensions and an increased passage cross-section with satisfactory mechanical characteristics.

11 Claims, 4 Drawing Sheets

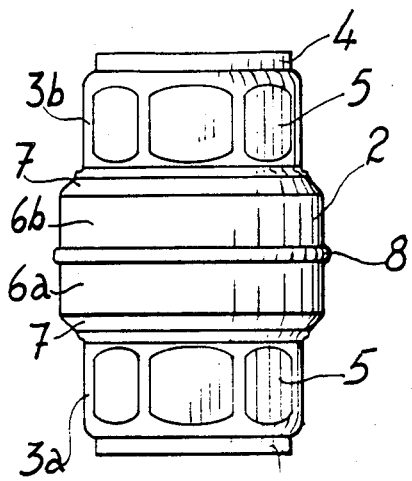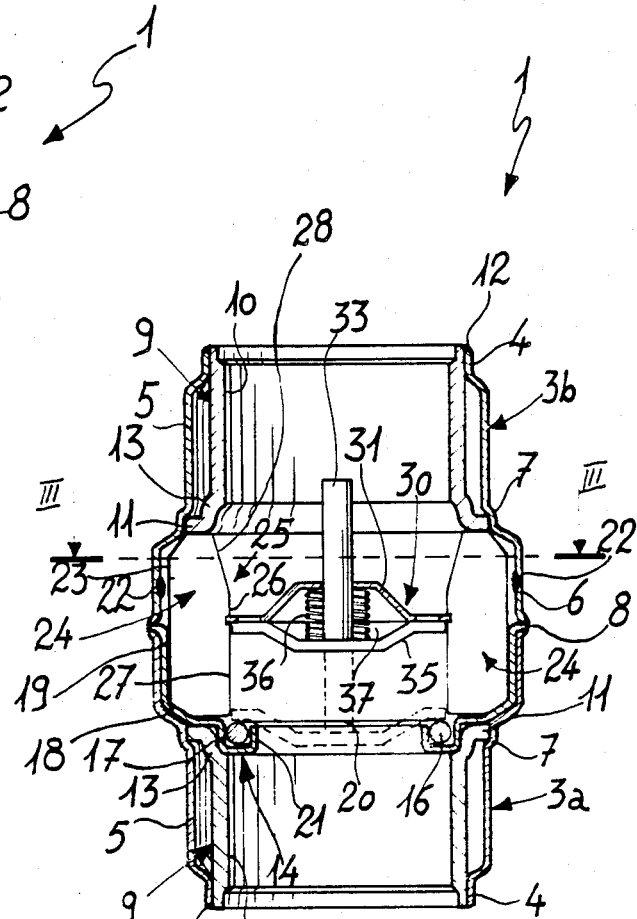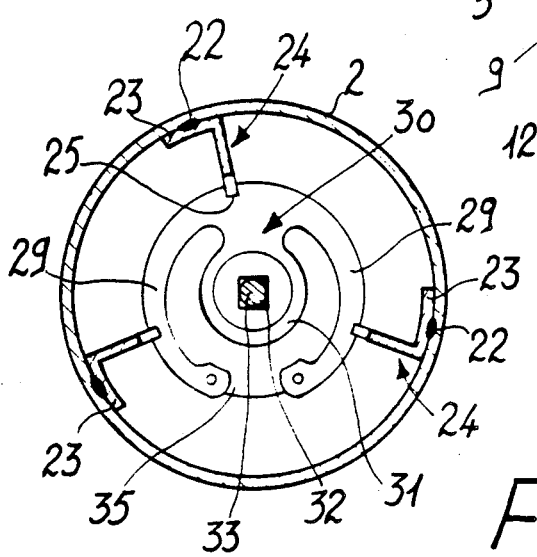

RETENTION VALVE PARTICULARLY FOR LIQUID-BEARING CONDUITS

BACKGROUND OF THE INVENTION

The present invention relates to a retention valve particularly for liquid-bearing conduits.

Retention valves are known and currently generally used which have a case made of pressed or diecast brass, which material is used since it has good technological properties and therefore allows easy machining.

These known kinds of valves are however not devoid of disadvantages, the main one being that, due to the well-known poor mechanical properties of brass, in the production of the valve it is often necessary to use high thicknesses of material, in order to achieve a satisfactory mechanical resistance.

This naturally entails a high final weight but most of all leads to a significant reduction in the cross section for the passage of the liquid with respect to the external diameter of the valve, giving rise to high hydraulic load losses which hinder and perturb the flow.

SUMMARY OF THE INVENTION

The main aim of the present invention is to eliminate the above described disadvantages in known kinds of valves, by providing a retention valve which, by virtue of its peculiar characteristics, has a significant passage cross-section with limited hydraulic losses with respect to a small outer bulk and which also has a high resistance, so as to offer the widest assurance of reliability and safety in use, even in the presence of corrosive or high-temperature liquids.

Within the scope of the above described aim, an object of the invention is to devise a retention valve which is able to ensure a perfect hydraulic seal against the return of the liquid, even in the presence of high pressures.

Another object of the invention is to provide a retention valve the component elements of which can be obtained simply and can furthermore be assembled quickly without requiring structural complications.

The above described aim, as well as these and other objects which will become apparent hereinafter, are achieved by a retention valve particularly for liquid-bearing conduits, characterized in that it comprises a containment body made of pressed sheet metal provided with at least two threaded sleeves, connectable to hydraulic conduits, internally of said containment body there being provided valve means adapted for cutting-off the flow of a liquid.

BRIEF DESCRIPTION OF THE DRAWINGS

Further characteristics and advantages of the invention will become apparent from the detailed description of a preferred, but not exclusive, embodiment of the retention valve, given only by way of example and illustrated in the accompanying drawings, wherein:

FIG. 1 is a front view of the retention valve;

FIG. 2 is a cross section view according to a longitudinal plane of the valve of FIG. 1;

FIG. 3 is a cross section view along the transverse plane III—III of FIG. 2;

DESCRIPTION OF THE PREFERRED EMBODIMENTS

Figure 4:
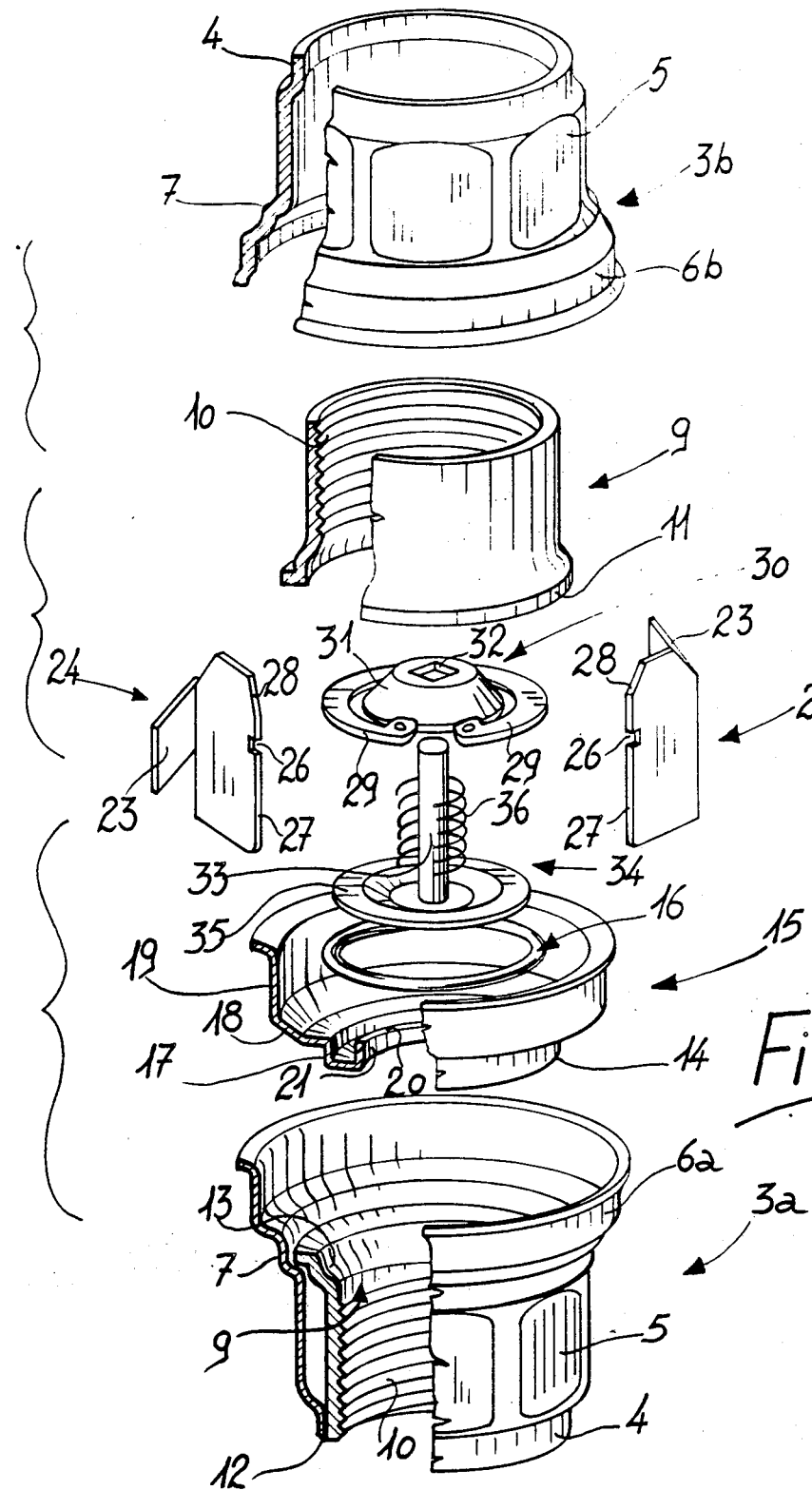
FIG. 4 is an exploded perspective view of the retention valve of FIGS. 1, 2 and 3.

With reference to FIGS. 1-4, a retention valve, according to the invention, generally indicated by the reference numeral 1, comprises an outer containment body 2 composed of two identical tubular half-shells 3a and 3b, obtained by pressing and shaping a stainless steel sheet. Each half-shell 3 has an opening at one circular end 4 which extends from a portion with a hexagonal cross section 5, the latter being suitable to constitute a grip element, e.g. when screwing on with keys and the like.

On the opposite side with respect to the circular end 4, the portion with an hexagonal cross section 5 is connected with a tubular region 6, having a greater diameter, by an intermediate band 7 which widens in concentrical steps.

The tubular regions 6a and 6b of the two half-shells 3a and 3b are advantageously sealingly connected at their head end by a tungsten inert gas (TIG) or the like circumferential welding 8.

Inside each half-shell 3 a tubular sleeve 9 is provided which has internal threads 10, which engages with the matching circular end 4 and extends to reach the intermediate band 7, where it has a radial edge 11 which is accommodated in one of the circumferential steps defined by the intermediate band 7.

It should be furthermore added that, appropriately, the two sleeves 9 are connected to the respective half-shell 3 by welding, advantageously, by means of tungsten inert gas or TIG welding 12 which sealingly joins the circular end 4 of the half-shell and the outer edge of the sleeve.

The two sleeves 9, at their radial edge 11, each have a shaping 13, one of which is used as a resting seat for the base 14 of a gasket-bearing insert 15, also, suitably made of pressed stainless steel.

More in detail, the base 14 has the shape of a circular crown, with substantially U-shaped cross section, defining a precise annular accommodation, closed on three sides, for a sealing gasket 16, e.g. of the O-ring type; on the outer side 17 of the base 14 the gasket-bearing insert 15 extends with a middle portion 18 which, by following the inside shape of the half-shell 3a, engages with the radial edge 11 and continues with a tubular wall 19 which is internally side-by-side with the tubular region 6 and is also fixed by tungsten inert gase (TIG) or the like welding 8 which joins the two half-shells 3a and 3b.

It is important to notice that the edge 20 of the internal side 21 of the base 14 has been flattened with remarkable dimensional precision to a measure such that the gasket 16 protrudes with respect thereto by a preset height, so that the crushing of the same gasket 16 is limited to an optimum value even in the case of high liquid pressures.

Inside the tubular portion 6 of the half-shell 3b without the gasket-bearing insert, the fixing tabs 23 of three metallic blades 24 are connected, e.g. by means of the weldings 22, which blades, arranged for symmetry in radial planes spaced at an angle of 120° from each other, extend longitudinally along the containment body 2, affecting the interior of the two tubular portions 6a and 6b.

Advantageously, the thickness of the tabs 23 is almost equal to that of the tubular wall 19 of the gasket-bearing insert 15 and the blades 24 follow, with their contour, the profile of the elements laying adjacent thereto; the side 25, instead, which is directed towards the interior of the valve, is divided by a notch 26, suitably provided by punching, in a first portion 27, substantially rectilinear and parallel to the axis, which extends from the notch 26 to the base 14 and in a second portion 28 which extends on the opposite side with respect to the notch 26 up to the radial edge 11 of the sleeve 9 of the half-shell 3b.

The tabs 29 of an elastic ring 30, of the SEEGER type, fix into the three notches 26, the central body 31 of said ring, having a substantially truncated-cone shape, elevates, with respect to the tabs 29, on the opposite side with respect to the gasket-bearing insert 15 and has a central hole 32, suitably provided with a square contour.

The cylindrical stem 33 of a movable shutter 34 is slideable in the square hole 32, the mushroom 35 of which shutter, raised centrally on the opposite side with respect to the central body 31 is slideable, guided by the rectilinear tracts 27 of the sides 25 of the blades 24.

Coaxially to the stem 33, a spiral spring 36 is arranged which, compressed between the elastic ring 30 and the mushroom 35, promotes the motion of the shutter 34 towards the sealing gasket 16; vice versa, upon opening the shutter 34, the spring 36 is accommodated in the chamber 37 defined by the central body 31 and by the mushroom 35, suitably cambered on opposite sides.

From what has been described, the operation of a retention valve according to the invention is evident and can be summarized as follows.

Once the valve 1 has been installed in a fluid-bearing conduit, according to a preset orientation, when the liquid tends to flow in the direction of the opening of the shutter 34, the mushroom 35, by compressing the spring 36, moves closer to the elastic ring 30 and allows the passage of the liquid; vice versa, the mushroom 35 abuts against the gasket 16, opposing a flow of the liquid in the opposite direction.

It should be appropriately noted that, even in the case of high pressures, the mushroom 35 can at the most deform the gasket 16 until it engages against the edge 20 of the interior 21 of the gasket-bearing holder 15; in this manner, the gasket 16 has been exempted from having to sustain the thrust of the liquid, and has only the task of acting as a sealing element, thereby limiting the crushing to which it may be subjected, to an optimum value, with notable and evident advantages both regarding the hydraulic seal and regarding the lifespan of the gasket.

Furthermore, the particular coupling of the square hole 32 with the stem 33 limits the contact between the two moving bodies in no more than 3 separate points, and has self-cleaning characteristics, which are particularly favorable in the use with liquids bearing impurities in suspension, thus improving the sliding and eliminating the danger of harmful jammings.

On the other hand, the elastic ring 30, besides making the assembly quick and safe, can be extracted, if required, from the interior of the valve 1, thus allowing, e.g., the replacement of the gasket 16, of the shutter 34, or of the spring 36.

From what has been described it is evident that the use of stainless steel sheet allows a radical change in constructive technology, moving from processes which implied the removal of shavings to pressing, shaping and welding processes, also obtaining a a very acceptable technological result together with an excellent mechanical resistance, even though remarkably smaller thicknesses are used.

In particular, it will be possible to prepare the individual components simply and quickly, starting from materials which are commonly commercially available, to perform the weldings 12 which join the sleeves 9 to the respective half-shells 3, to join the blades 24 to their half-shell 3b and, after easily inserting the gasket-bearing insert 15 on one side and the elastic ring 30 with the respective spring 36 and shutter 34 on the other, to join the whole and perform the circumferential TIG welding 8 to obtain a single perfectly sealed part.

Figure 5:
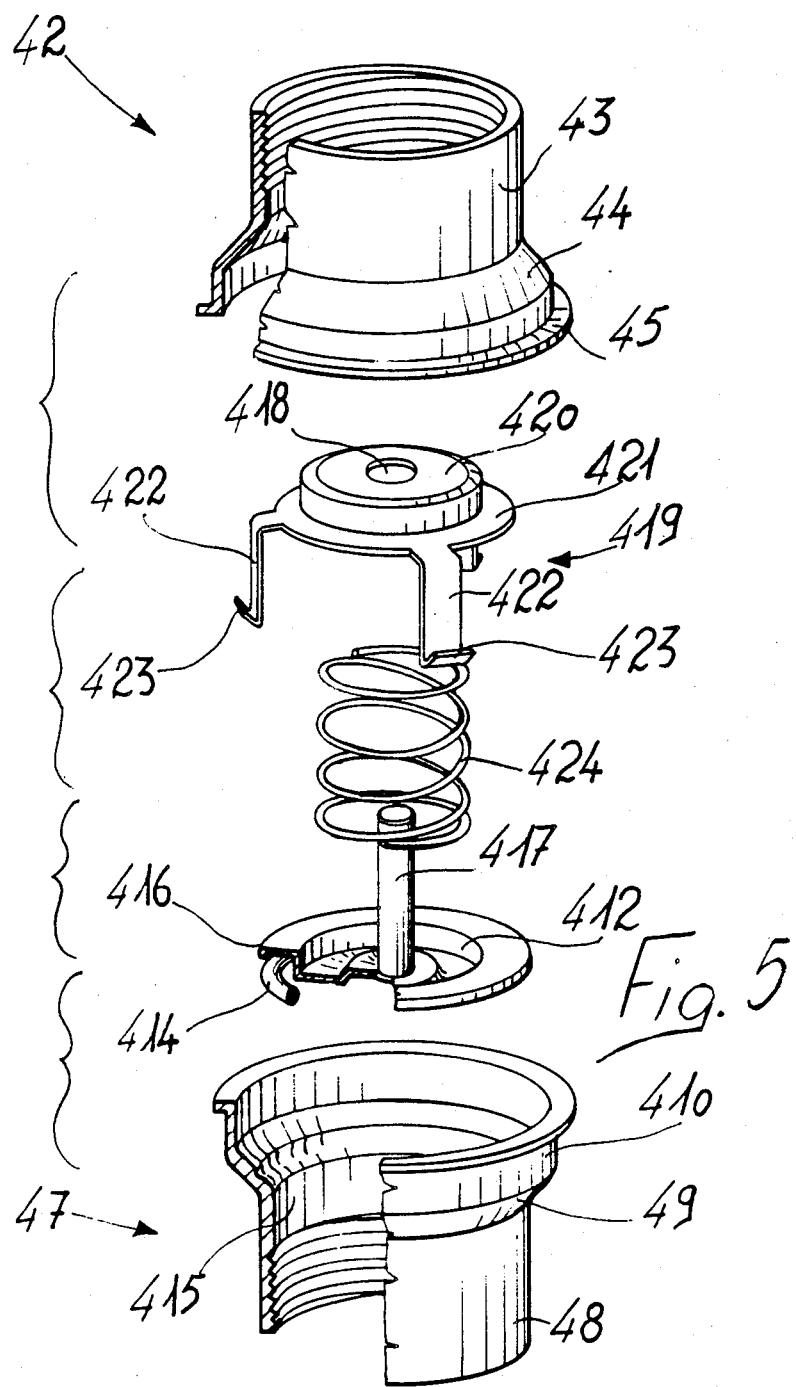
FIG. 5 is an exploded perspective view of another aspect of the retention valve according to the invention, with partial cross-sections of some elements.
Figure 6:
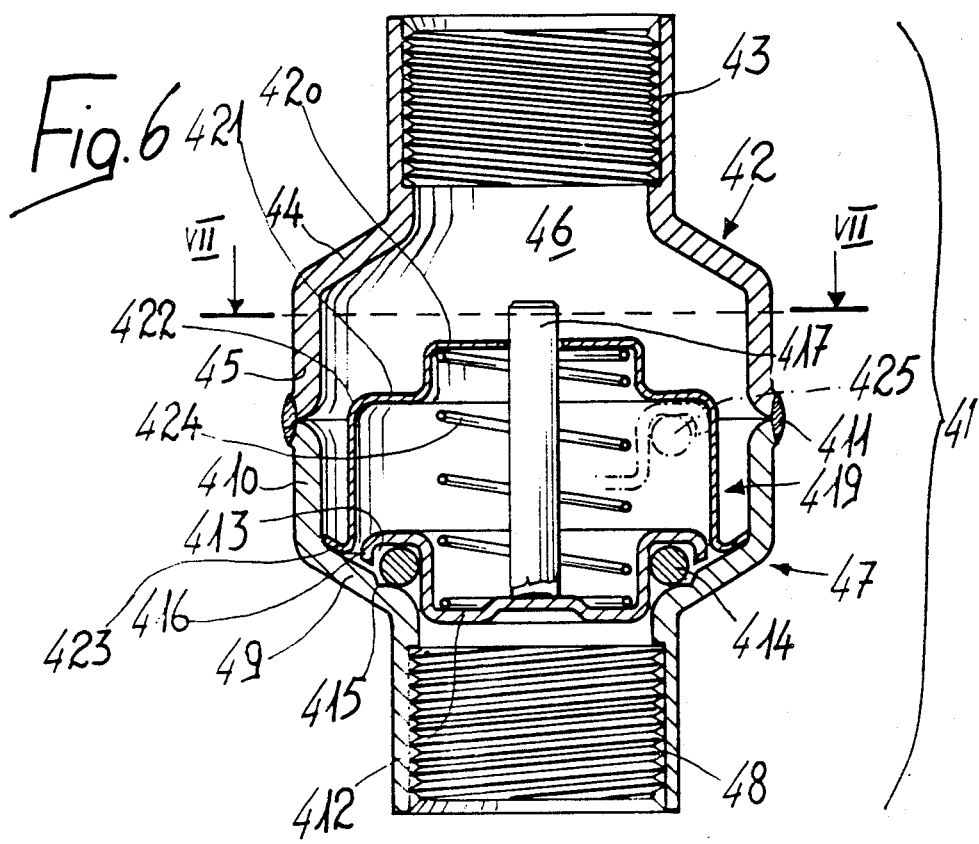
FIG. 6 is a cross section view of the valve of FIG. 5, along two planes passing through its axis and inclined with respect to each other by an angle of 120° as indicated with VI—VI in FIG. 7.
Figure 7:
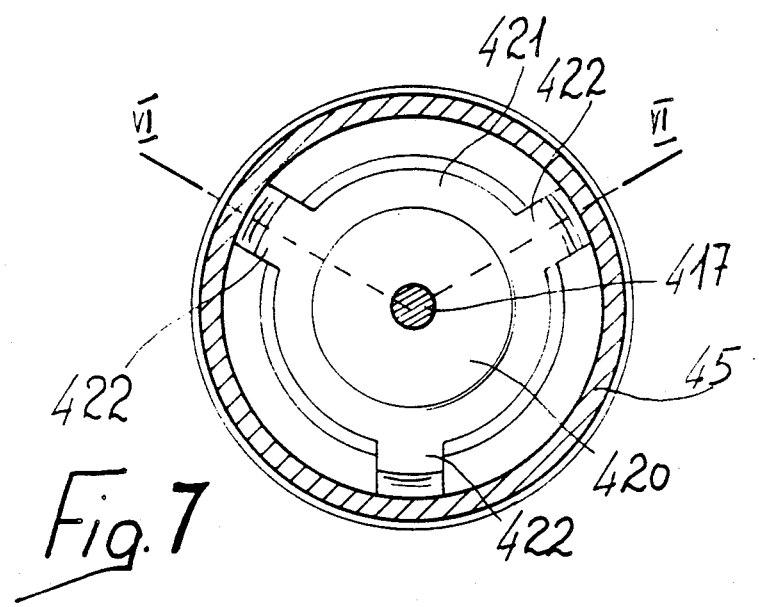
FIG. 7 is a cross section view along the line VII—VII of FIG. 6.

FIGS. 5, 6 and 7 illustrate another aspect of the valve according to the invention, composed of a containment body 41 composed of a first half-shell 42 having on one side a threaded sleeve 43 suitable for threaded association with the piping where the valve will be interposed. Said threaded sleeve 43 continues with a funnel-like widened region 44 and with a further cylindrical portion 45. This widening obtained in the pressing process allows the formation of a chamber 46 with a greater diameter adapted for containing the sealing elements of the valve. The second half-shell 47 is identical to the first half-shell 42 in shape and is provided therefore with a second threaded sleeve 48 connected to a funnel-like portion 49 and to a cylindrical portion 410, identical to the portion 45, to which it will be associated by means of a welding 411 which will be performed after the insertion of all the internal elements of the valve. The internal elements of the valve are composed of a disk-like shutter having a peripheral seat 413 adapted for accommodating a sealing gasket 414 of the O-ring type in a working seat 415 obtained by milling a circular crown at the interior of the tilted region 49 of the second half-shell 47.

The slot 413 has a peripheral abutment edge 416 which allows limitation of the crushing or compression of the gasket 414 under high pressures.

To the shutter 412 is associated an axial metallic stem 417, which is guided inside a hole 418 of a guiding cage 419.

The cage 419 is composed of a drawn disk 420 which has formed therein a hole 418, and which is enlarged into a circular crown 421 from which three tabs 422 extend substantially perpendicularly, the folded ends 423 of which are welded to the interior of the second half-shell 47 after a spring 424 has been interposed between the shutter 412 and the drawn disk 420, for biasing them apart against the flow of the liquid.

The length of the tabs 422 determines the stroke of the shutter 412 which can reach the position shown in broken lines and indicated with the reference numeral 425 in FIG. 6.

Regarding the production and the assembly of the various parts which compose the valve, after the shutter 412 has been prepared and the stem 417 has been welded thereon, the O-ring gasket 414 is inserted and the spring 424 is positioned.

At this point, once the shutter 412 has been positioned within the half-shell 47, the cage 419 is inserted and the tabs 423 thereof are welded to the half-shell 47.

Subsequently, the first half-shell 42 is positioned coaxially, and the perimetral welding 411 is performed.

At this point the valve is completely assembled and ready for use.

This second aspect of the invention has proved to be more suitable for piping with small diameters due to its greater constructive simplicity, obtained by reducing the number of internal components.

In practice it has been observed that the valve, according to the invention, fully achieves the intended aims since the reduction in thickness, and therefore the consequent increase of the passage cross-sections, the smoothness of the surfaces which can be obtained with the material and the manufacturing processes described above and a particular care to all the elements and internal parts of the valve have allowed the achievement of surprising results in reducing load losses; thus, at a normal flow rate, a valve according to the invention gives rise to a load loss which can be smaller by 60% with respect to the brass valves commonly used.

The use of stainless steel as a starting material, of the type which for each instance can be selected advantageously among the many ones availaable, in combination with sealing elements in a suitable elastic material, leads to the production of valves with excellent characteristics of chemical resistance and therefore particularly suitable for being used, e.g., with seawater or with corrosive liquids, even at high temperature.

The invention thus conceived is susceptible to numerous modifications and variations, all of which are within the scope of the inventive concept, and furthermore all the details can be replaced by other technically equivalent elements.

In practice, the materials employed, as well as the dimensions, may be any according to the requirments and the state of the art.

I claim:

1. Retention valve particularly for liquid bearing conduits comprising at least two identical half shells, said half shells being associated by welding and defining a containment body, said containment body having valve means and at least two sleeves, said sleeves being connectable to hydraulic conduits, said valve means being adapted to cut off liquid flow in said conduit, said valve means comprising a shutter having a moveable mushroom, said moveable mushroom having at least one stem and at least one head, said valve means further comprising a gasket bearing insert, and a plurality of blades, said containment body having defined therein radial planes, said blades being arranged in said radial planes and angularly offset from each other, said blades defining internal sides, said internal sides of said blades having formed therein notches, said notches being adapted for removably accomodating at least one elastic ring having formed therein a central hole, said stem of said shutter being slideable in said central hole, said valve further comprising elastic means, said elastic means acting between said head of said mushroom and said elastic ring.

2. Retention valve, according to claim 1, wherein said half-shells are provided with a tubular region having a greater diameter connected by an intermediate band with concentric steps to a region with a hexagonal cross section, adapted to act as a grip element, the tubular regions of said half-shells being sealingly joined by a circumferential welding.

3. Retention valve, according to claim 2, wherein each of said sleeves extends internally coaxial with the respective half-shell, ending in a radial edge accommodated in one of the circumferential steps defined by said intermediate band.

4. Retention valve, according to claim 3, wherein sleeves are connected to the respective half-shells by annular weldings extending along said circular ends.

5. Retention valve, according to claim 2, wherein in that said gasket-bearing insert is provided with a middle section extending from said base and engaging with said radial edge, from said middle section there extending a tubular wall, arranged internally side by side to said tubular region and fixed by said circumferential welding.

6. Retention valve, according to caim 1, wherein said gasket-bearing insert has a base in the shape of a circular crown defining an annular accommodation for a toroidal sealing gasket against which said mushroom of said shutter, movable against the biasing action of elastic means, engages transitorily.

7. Retention valve, according to claim 6, wherein base is provided with one of its sides extending internally coaxial to said gasket, the edge of said side facing towards said shutter and being slightly moved back with respect to said gasket, defining an arrestor element for said mushroom suitable to limit to a preset value the compression of said gasket.

8. Retention valve, according to claim 6, wherein said blades have internal sides with portions which are essentially rectilinear and parallel to the axis of said containment body, said portions extending from said notches in the direction of said base, and constituting guiding elements for the motion of said mushroom.

9. Retention valve, according to claim 1, wherein the central body of said elastic ring rises, with a substantially truncated-cone shape, on the opposite side with respect to a central raised portion provided in said mushroom head, said central body and said central raised portion defining, upon the opening of said shutter, a chamber for the accommodation of said elastic means.

10. Retention valve, according to claim 1, wherein said central hole has a square contour, said stem having an essentially circular cross section.

11. Retention valve, according to claim 1, and wherein said gasket-bearing insert is provided with a middle section extending from said base and engaging with said radial edge, from said middle section there extending a tubular wall, arranged internally side by side to said tubular region and fixed by said circumferential welding and wherein said blades have on their outer sides fixing tabs connected to said tubular region of said half-shell opposite said gasket-bearing insert, said fixing tabs having a thickness which is essentially equal to that of said tubular wall of said gasket-bearing insert.

* * * * *